United States Patent [19]
Setoguti et al.

[11] Patent Number: 4,692,835

[45] Date of Patent: Sep. 8, 1987

[54] FUSE CIRCUIT UNIT FOR COMBINATION WITH AN ELECTROMAGNETIC SWITCH

[75] Inventors: Syohati Setoguti; Yoshiteru Nakatake, both of Miyazaki; Mitsuru Uehara, Kawagoe; Masayuki Kudou, Shiki, all of Japan

[73] Assignees: Honda Giken Kogyo K.K., Tokyo; Honda Manufacturing Co., Ltd., Miyazaki, both of Japan

[21] Appl. No.: 780,395

[22] Filed: Sep. 26, 1985

[30] Foreign Application Priority Data

Oct. 3, 1984 [JP] Japan ............ 59-206297
Oct. 3, 1984 [JP] Japan ............ 59-148966[U]
Oct. 9, 1984 [JP] Japan ............ 59-210495

[51] Int. Cl.[4] ............ H02H 5/04

[52] U.S. Cl. ............ 361/104; 337/6; 337/7

[58] Field of Search ............ 335/142, 143, 43; 337/4, 5, 6, 7; 361/103, 104, 109

[56] References Cited

U.S. PATENT DOCUMENTS

| | | | |
|---|---|---|---|
| 2,924,688 | 2/1960 | Edmunds | 361/104 X |
| 3,030,474 | 4/1962 | Scott | 337/7 |
| 3,280,280 | 10/1966 | Gryctko | 337/6 |
| 3,796,978 | 3/1974 | Grunert et al. | 335/142 |
| 3,958,197 | 5/1976 | Gryctko | 337/6 X |

FOREIGN PATENT DOCUMENTS 55-15707 7/1953 Japan .

*Primary Examiner*—A. D. Pellinen
*Assistant Examiner*—A. Jonathan Wysocki
*Attorney, Agent, or Firm*—Frishauf, Holtz, Goodman & Woodward

[57] ABSTRACT

A fuse circuit unit for combination with an electromagnetic switch has a first terminal having one end thereof adapted to be connected to one terminal of a main fuse of a load circuit, and another end adapted to be connected to of the input terminal of the electromagnetic switch. The fuse circuit unti also has a second terminal having one end thereof adapted to be connected to another terminal of the main fuse, and another end adapted to be connected to the load circuit, and a casing supporting the first and second terminals. The casing of the fuse circuit unit is engageable with the electromagnetic switch, and the first terminal of the fuse circuit unit is removably fastened to the input terminal of the electromagnetic switch to mechanically and electrically connect them together. The casing is molded from a resin in a one-piece body, together with the first and second terminals.

9 Claims, 6 Drawing Figures

FUSE CIRCUIT UNIT FOR COMBINATION WITH AN ELECTROMAGNETIC SWITCH

BACKGROUND OF THE INVENTION

This invention relates to a fuse circuit unit, and more particularly to a fuse circuit unit which can be dismountably mounted on an electromagnetic switch.

An automotive vehicle is equipped with various electric equipments. In automotive vehicles having a limited space for such electric equipments, such as motorcycles, not a few electric equipments are designed such that an electric equipment carries thereon another electric equipment related thereto or its component parts in a combined fashion. For example, an electromagnetic switch for closing and opening a starting circuit of an automotive engine has been proposed by Japanese Provisional Utility Model Publication No. 55-15707, on which is integrally mounted a main fuse of a main circuit connecting between electrical loads of the automotive vehicle and the battery.

However, an electromagnetic switch and a main fuse of a load circuit such as a lamp of an automotive vehicle are inherently not electrically related to each other, and therefore there is no absolute necessity to combine such fuse with the electromagnetic switch. For this reason, in conventional automotive vehicles in general there are used some electromagnetic switches of the type carrying no fuse. Therefore, a switch manufacturer has to supply electromagnetic switches of the type carrying no fuse, as well as ones of the type carrying a fuse. As a result, the manufacturer has to manufacture both of these types, which is disadvantageous in respect of productivity, stock control, etc.

SUMMARY OF THE INVENTION

It is the object of the invention to provide a fuse circuit unit which can be dismountably mounted on an electromagnetic switch, thereby adapting the same electromagnetic switch to be both combined with a fuse and separate therefrom and thus enhancing the mass productivity.

The present invention provides a fuse circuit unit for combination with an electromagnetic switch having an input and an output terminal. The fuse circuit unit comprises: a first terminal member having one end therof adapted to be connected to one terminal of a main fuse of a load circuit, and another end adapted to be connected to the input terminal of the electromagnetic switch; a second terminal member having one end thereof adapted to be connected to another terminal of the fuse, and another end adapted to be connected to the load circuit; a casing supporting the first and second terminal members; engaging means provided on the casing for engagement with engaging means provided on the electromagnetic switch; and fastening means for removably fastening the first terminal member to the input terminal of the electromagnetic switch to mechanically and electrically connect them together. Preferably, the casing of the fuse circuit unit is molded from a resin in a one-piece body, together with the first and second terminal member. Also preferably, the engaging means provided on the casing is formed integrally with the casing.

According to a preferred embodiment of the present invention, there is provided a fuse circuit unit for combination with an electromagnetic switch of the type having a switch casing, a coil accommodated within the switch casing, a cover secured to the switch casing, an input terminal and an output terminal each having a connecting screw-threaded portion thereof outwardly projected from the cover, and a pair of connecting terminals of the coil outwardly projected from the cover. The fuse circuit unit comprises: a first terminal member having one end thereof formed with a holding portion for holding one terminal of a fuse, and another end thereof formed with a through hole for having the connecting screw-threaded portion of the input terminal of the electromagnetic switch disengageably fitted therethrough; a second terminal member having one end thereof formed with a holding portion for holding another terminal of the fuse, and another end thereof provided with an output terminal portion disposed for juxtaposition with the connecting terminals of the coil; a casing supporting the first and second terminal member and defining therein a fuse-accommodating space enclosing the holding portions of the first and second terminal members, and a terminal-accommodating space enclosing the output terminal portion of the second terminal member and an opening formed in the casing and adjacent the output terminal portion, the opening being disposed to be penetrated by the connecting terminals of the coil; engaging means provided on the casing for engagement with engaging means provided on the cover of the electromagnetic switch for holding the casing combined with the cover; and screw means for removably fastening the another end of the first terminal member having the through hole fitted on the connecting screw-threaded portion to mechanically and electrically connect them together.

The above and other objects, features and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
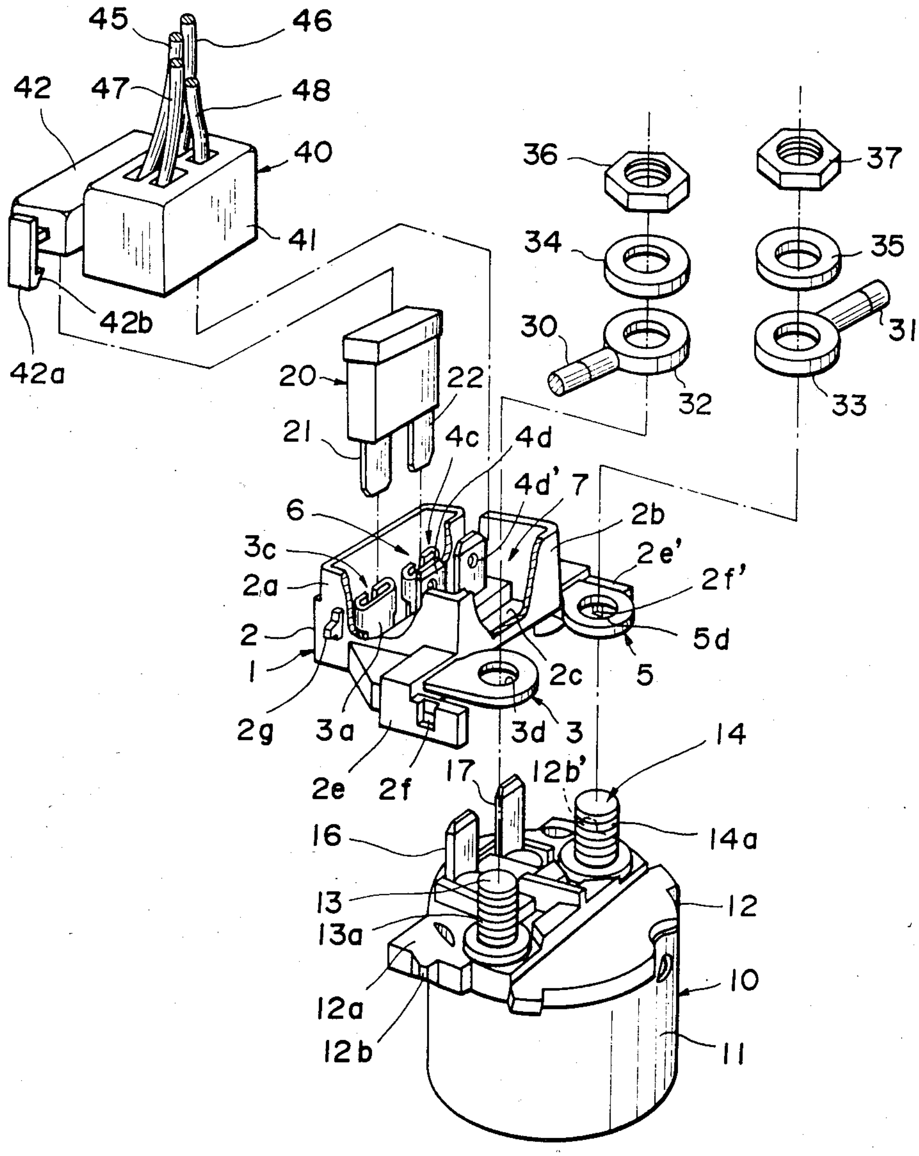
FIG. 1 is an exploded perspective view, partly broken away, of a fuse circuit unit according to an embodiment of the invention and an electromagnetic switch to be combined with the fuse circuit unit.

Referring first to FIG. 1 showing a fuse circuit unit according to the invention, useful in explaining how to mount the fuse circuit unit 1 onto an electromagnetic switch 10, the fuse circuit unit 1 is adapted to be dismountably mounted on the electromagnetic switch 10 in such a manner that its terminals 3 and 5 are fitted on fixed contact members 13 and 14 of the electromagnetic switch 10 together with feeder cables 30 and 31 and then fastened thereto, as hereinafter described.

Figure 3:
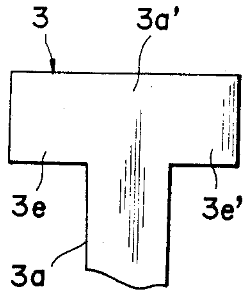
FIG. 3 is an unfolded view of one of the terminals shown in FIG. 2.
Figure 4:
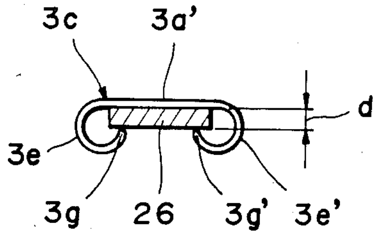
FIG. 4 is an end view, partly in section, of a fuse-connecting portion of the terminal of FIG. 3.

The fuse circuit unit 1 is essentially composed of a casing 2, and terminals 3, 4 and 5 secured within the casing 2. The terminal 3 also serving as a mounting terminal has one end 3*a* thereof formed as a fuse-connecting terminal portion 3*c*, and the other end 3*b* formed therein with a fitting through hole 3*d*. The fuse-connecting terminal portion 3*c* has a generally T-shaped configuration when unfolded, as shown in FIG. 3, and has a pair of rectangular wings 3*e* and 3*e'* laterally projecting in a symmetrical fashion. As shown in FIGS. 3 and 4, these wings 3*e*, 3*e'* are bent toward a central portion 3*a'*, with its lateral edges 3*g* and 3*g'* directed toward an inside surface of the central portion 3*a'* with a predetermined gap d between them. The gap d is set at a value slightly smaller than the thickness of a terminal 21 of a main fuse 20 formed e.g. of a blade fuse. The diameter of the fitting through hole 3*d* in the end 3*b* of the mounting terminal 3 is set at a value slightly larger than the outer diameter of a bolt-shaped or screw-threaded portion 13*a* of the fixed contact member 13 of the electromagnetic switch 10.

The mounting terminal 3 constructed as above is formed of a one-piece metal sheet, preferably of copper such that the bent wings 3*e*, 3*e'* are elastically urged in the folding direction to fully function as contacts.

Figure 2:
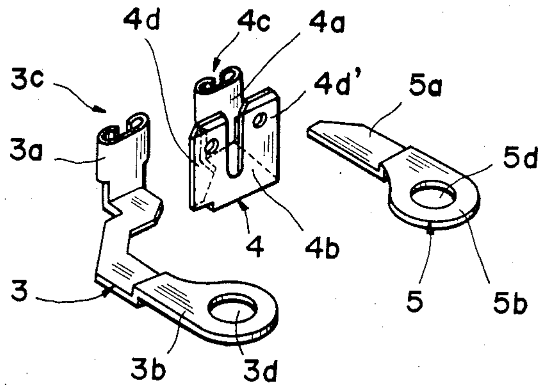
FIG. 2 is an exploded perspective view of terminals of the fuse circuit unit in FIG. 1.

The terminal 4 has one end 4*a* thereof formed as a fuse-connecting terminal 4*c* and the other end 4*b* bifurcated into two connecting terminal portions 4*d* and 4*d'* and extending parallel with the connecting terminal portion 4*c*, as shown in FIG. 2. The connecting terminal portion 4*c* has just the same configuration and is wrought in the same manner as the connecting terminal portion 3*c*. Also the mounting terminal 4 is formed of a one-piece metal sheet, preferably of copper, like the mounting terminal 3. These connecting terminal portions 3*c*, 4*c* of these mounting terminals 3, 4 are to be connected with respective connecting terminals 21 and 22 of the blade fuse 20 and mecanically coupled thereto in a manner supporting the blade fuse 20.

The terminal 5 also serving as a mounting terminal is provided to reinforce or stabilize the connection of the fuse circuit unit 1 to the electromagnetic switch 10. One end 5*a* of the mounting terminal 5 is obliquely cut off and the other end 5*b* is formed therein with a fitting through hole 5*d* similar to the mounting through hole 3*d* of the mounting terminal 3. This mounting terminal 5 per se is not electrically connected to any other component parts, but merely serves to mechanically reinforce the mounting of the fuse circuit unit 1 to the electromagnetic switch 10.

Figure 5:
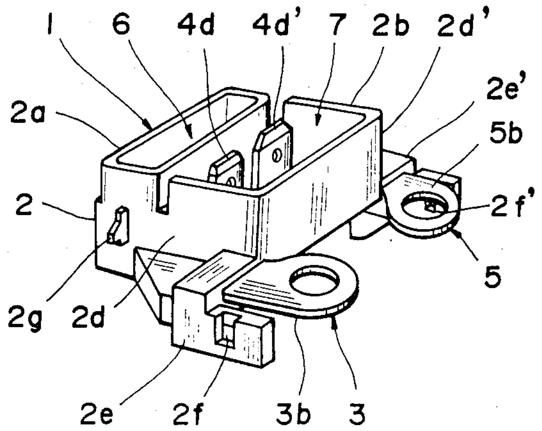
FIG. 5 is a perspective view of the fuse circuit unit.

These terminals 3, 4 and 5 are arranged in a predetermined array as shown in FIG. 2, and retained in place after the casing 2 is formed into a one-piece body by molding from a synthetic resin material with these mounting terminals maintained in their respective places so that they are partly fixedly embedded in the hardened synthetic resin. Thus, the fuse circuit unit 1 is completed as shown in FIG. 5. In the completed unit 1, the connecting terminal portions 3*c*, 4*c* are accommodated within a fuse-accommodating space 6 defined by a four-sided peripheral wall 2*a* of the casing 2. The other connecting terminal portions 4*d*, 4*d'* of the terminal 4 are accommodated within a terminal-accommodating space 7 defined by a three-sided peripheral wall 2*b* and the peripheral wall 2*a*. The casing 2 has a bottom wall formed therein with an opening 2*c* (FIG. 1) enclosed by the peripheral wall 2*b* and extending along the connecting erminal portions 4*d*, 4*d'* and through which connecting terminals 16 and 17 of the electromagnetic switch 10 are to be loosely fitted. Further, the casing 2 has opposite lateral side surfaces 2*d* and 2*d'* formed integrally with downwardly pending engaging portions 2*e* and 2*e'* at locations close to the other ends 3*b*, 5*b* of the mounting terminals 3, 5. These engaging portions 2*e*, 2*e'* are formed with engaging through holes 2*f* and 2*f'* which open in ceiling surfaces of the engaging portions 2*e*, 2*e'*. On the other hand, the opposite lateral side surfaces 2*d*, 2*d'* of the casing 2 are formed integrally with a pair of engaging protuberances 2*g* (only one of which is shown) at vertically central portions of the peripheral wall 2*a*.

Referring again to FIG. 1, the electromagnetic switch 10 is formed by a casing 11, and a cover 12 secured to the casing 11 in a manner covering an opening, not shown, in the casing 11. The fixed contact members 13 and 14 and a movable contact member 15 (FIG. 6) are arranged on the cover 12. The fixed contact members 13, 14 have bolt-shaped or screw-threaded portions 13*a* and 14*a* vertically upwardly projected from a ceiling surface 12*a* of the cover 12. Further arranged on the same ceiling surface 12*a* of the cover 12 are coil-connecting terminals 16 and 17. The terminals 16 and 17 extend vertically upwardly in parallel with the bolt-shaped portions 13*a*, 14*a* of the fixed contact members 13, 14. The cover 12 has its opposite lateral side edges formed integrally with engaging protuberances 12*b*, 12*b'* for mating with the respective engaging through holes 2*f*, 2*f'* of the fuse circuit unit 1.

Figure 6:
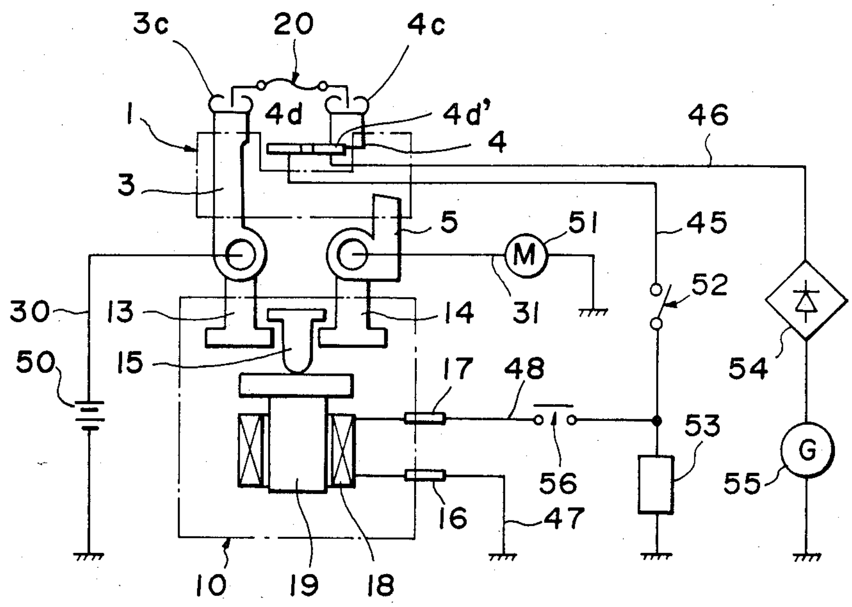
FIG. 6 is a circuit diagram of an electrical circuit incorporating a fuse circuit unit according to the invention and an electromagnetic switch.

Accommodated within the casing 11 are a coil 18, and a plunger 19 disposed to move within a central opening of the coil 18 against the force of a return spring, not shown, as shown in FIG. 6. The coil 18 has its opposite ends connected to the respective connecting terminals 16, 17 projected on the cover 12, at locations inside the casing 11. The cover 12 is fitted with the casing 11 and rigidly secured thereto by caulking.

A coupler 40 is provided, which is adapted to be inserted, from above, into the terminal-accommodating space 7 in the fuse circuit unit 1, and comprises a main body 41, and a cover 42 which is fitted over an upper portion of the peripheral wall 2*a* defining the fuse-accommodating space 6. The cover 42 has its opposite lateral side surfaces provided with a pair of downwardly depending engaging pieces 42*a* (only one of which is shown), which each have its tip formed with an engaging pawl 42*b* for engagement with the respective protuberances 2*g* on the opposite lateral side surfaces of the peripheral wall 2*a* of the casing 2. Disposed within the interior of the main body 41 are connecting terminals, not shown, for connection with respective ones of the connecting terminal portions 4*d*, 4*d'* of the mounting terminal 4 and coil-connecting terminals 16, 17 of the electromagnetic switch 10. Connected to these connecting terminals within the main body 41 are ends to wires 45–48 which are connected at the other ends to electrical equipments, etc., hereinafter referred to.

To mount the fuse circuit unit 1 onto the electromagnetic switch 10, first the connecting terminals 21, 22 of the blade fuse 20 are force fitted into the respective connecting terminal portions 3*c*, 4*c* of the mounting terminals 3, 4 of the fuse circuit unit 1 so that the terminals 3, 4 are electrically connected to each other by way of the blade fuse 20, and at the same time the blade fuse 20 is placed inside the fuse-accommodating space 6 of the casing 2. Then, as shown in FIG. 1, the mounting through holes 3*d*, 5*d* of the mounting terminals 3, 5 are fitted, from above, onto the screw-threaded portions 13*a*, 14*a* of the fixed contact members 3, 5 on the cover 12 of the electromagnetic switch 10, and then moved downward along the screw-threaded portions 13*a*, 14*a*, until the protuberances 12*b*, 12*b'* of the cover 12 become engaged with the respective engaging through holes 2*f*, 2*f'* of the engaging portions 2*e*, 2*e'* of the casing 2. In this way, the fuse circuit unit 1 is mounted on the cover 12 wherein the screw-threaded portions 13*a*, 14*a* of the fixed contact members 13, 14 penetrate through the mounting holes 3*d*, 5*d* of the mounting terminals 3, 5, the coil-connecting terminals 16, 17 are loosely fitted through the opening 2*c* of the casing 2 to extend in the upward vertical direction in parallel juxtaposition with the connecting terminal portions 4*d*, 4*d'* of the mounting terminal 4.

Then, a solderless terminal 32 joined to a feeder cable 30 is fitted onto the screw-threaded portion 13*a* of the fixed contact member 13, a nut 36 is screwed onto the portion 13*a* to tighten the mounting terminal 3 and the solderless terminal 32 together via a washer 34 fitted on the portion 13*a*. Thus, the mounting terminal 3 is electrically and mechanically connected to the fixed contact member 13. Similarly, a solderless terminal 33 joined to a feeder cable 31 is fitted onto the screw-threaded portion 14*a* of the fixed contact member 14, following by fitting a washer 35 and screwing a nut 37 onto the portion 14*a* to tighten the mounting terminal 5 and the solderless terminal 33 together via the washer 35. In this way, the fuse circuit unit 1 is firmly secured on the cover 12 of the electromagnetic switch 10.

After thus mounting the fuse circuit unit 1 onto the electromagnetic switch 10, the coupler 40 is mounted, from above, onto the casing 2 in such a manner that the main body 41 is inserted into the terminal-accommodating space 7 to connect its connecting terminals to the respective connecting terminals 4*d*, 4*d'*; 16, 17, the cover 42 is fitted over the upper portion of the fuse-accommodating space 6 to enclose the fuse 20 within the space 6, and the engaging pawls 42*b* engage the engaging protuberances 2*g*.

The feeder cables 30, 31 are connected at ends, respectively, to a positive terminal of the battery 50 and a connecting terminal of a starting motor 51 of an internal combustion engine, not shown. The connecting terminal portion 4*d* of the terminal 4 of the fuse circuit unit 1 is connected to a load 53 by way of a wire 45 and a main switch 52, and the connecting terminal portion 4*d'* of same is connected to an output terminal of an alternating current generator 55 installed on the engine, by way of a wire 46 and a rectifier 54. The coil-connecting terminal 16 of the electromagnetic switch 10 is ground via a wire 47, and the other coil-connecting terminal 17 is connected to a load-connecting terminal of the main switch 52 by way of a wire 48 and a starting switch 56.

With the above arrangement, when the main switch 52 is closed, the load 53 becomes connected to the battery 50 through the fuse 20 to be supplied with electric power from the battery 50. When the starting switch 56 is then closed, the coil 18 is energized so that the plunger 19 is electromagnetically attracted to move downward against the force of the return spring, not shown, so that the movable contact member 15 is brought into urging contact with the fixed contact members 13, 14 by the force of a contact spring, not shown, to close the electromagnetic switch 10, thereby actuating the starting motor 51 to start the engine. When the starting switch 56 is opened after the engine has been started, the coil 18 is deenergized so that the plunger 19 is moved upward by the force of the return spring to push up the movable contact member 15 against the force of the contact spring to separate the former from the latter, thereby causing the electromagnetic switch 10 to open and thus stopping the starting motor 51.

After having thus been started, the engine drives the generator 55 to generate an alternating current output. The alternating current output is converted into direct current by the rectifier 54, and supplied to the battery 50 through the terminal 4, fuse 20, mounting terminal 3, and feeder cable 30, to charge same.

The fuse circuit unit according to the invention can provide many excellent advantages as follows:

(i) Since the fuse circuit unit can dismountably be mounted onto an electromagnetic switch whenever it is necessary to do so according to the use of the switch, it is possible to design the electromagnetic switch with the same or single specifications, irrespective of whether it is to be combined with a fuse circuit or not, and it is also possible to manufacture electromagnetic switches alone in a manner independent in number from the fuse circuit unit, thereby being very advantageous in manufacturing the switches on a mass production basis as well as in controlling the stock;

(ii) Since the first terminal of the fuse circuit unit can be tightened onto an input terminal of the electromagnetic switch, the fuse circuit unit can be firmly secured onto the electromagnetic switch, and also can positively electrically be connected thereto;

(iii) Since the first and second terminals of the fuse circuit unit are firmly secured to the casing by molding the casing together with these terminals, they are free of backlash or pitch error, it is possible to manufacture the fuse circuit unit with close tolerances.

What is claimed is:

1. The combination of a fuse circuit unit and an electromagnetic switch, said electromagnetic switch having an input terminal which connects to a power supply means; an output terminal which connects to a first load circuit; and a closed switch casing; and said fuse circuit unit comprising:

a first terminal member having one end thereof which is connectable to one terminal of a main fuse of a second load circuit, and another end which is connectable to said input terminal of said electromagnetic switch and to said power supply means;

a second terminal member having one end thereof which is connectable to another terminal of said fuse, and another end which is connectable to said second load circuit;

a casing supporting said first and second terminal members;

engaging means provided on said casing of said fuse circuit unit for mechanical engagement with engaging means provided on said electromagnetic switch; and fastening means for removably fastening said first terminal member to said input terminal of said electromagnetic switch to mechanically and electrically connect said fuse circuit unit and said electromagnetic switch together;

said engaging means and said fastening means cooperatively mechanically and electrically interconnecting said fuse circuit unit and said electromagnetic switch together such that said first load circuit is fed from said power supply means via said input and output terminals of said electromagnetic switch, and said second load circuit is fed from said power supply means via said first and second terminals of said main fuse, said fuse circuit unit and said electromagnetic switch being independently operable.

2. A fuse circuit unit as claimed in claim 1, wherein said casing of said fuse circuit unit is molded from a resin in a one-piece body, together with said first and second terminal members.

3. A fuse circuit unit as claimed in claim 1, wherein said engaging means provided on said casing is formed integrally with said casing.

4. A fuse circuit unit as claimed in claim 1, further including:

a third terminal member having one end thereof which is connectable to said output terminal of said electromagnetic switch; and second fastening means for removably fastening said third terminal member to said output terminal of said electromagnetic switch to mechanically connect them together, said third terminal member cooperating with said first terminal member to reinforce the connection of said casing with said electromagnetic switch.

5. A fuse circuit unit as claimed in claim 1, wherein said load circuit includes a main switch, said another end of said second terminal member being electrically connected to said main switch.

6. The combination of a fuse circuit unit and an electromagnetic switch said electromagnetic switch having a switch casing, a coil accommodated within said switch casing, a cover secured to said switch casing, said switch casing and said cover cooperatively forming a closed casing, an input terminal and an output terminal, each of said input and output terminals having a connecting screw-threaded portion thereof outwardly projected from said cover, said input terminal being connectable with a power supply means and said output terminal being connectable with a first load circuit, and a pair of connecting terminals of said coil outwardly projected from said cover; and said fuse circuit unit comprising:

a first terminal member having one end thereof formed with a holding portion which holds one terminal of a fuse for a second load circuit, and another end thereof formed with a through hole which disengageably receives said connecting screw-threaded portion of said input terminal of said electromagnetic switch therethrough, said first terminal member being connectable with said power supply means;

a second terminal member having one end thereof formed with a holding portion which holds another terminal of said fuse, and another end thereof provided with an output terminal portion disposed for juxtaposition with said connecting terminals of said coil, said second terminal being connectable with said second load circuit;

a casing supporting said first and second terminal members and defining therein a fuse-accommodating space surrounding said holding portions of said first and second terminal members, and a terminal-accommodating space surrounding said output terminal portion of said second terminal member and an opening formed in said casing and adjacent said output terminal portion, said opening being penetrable by said connecting terminals of said coil;

engaging means provided on said casing of said fuse circuit unit for mechanical engagement with engaging means provided on said cover of said electromagnetic switch for mechanically holding said casing of said fuse circuit unit combined with said cover of said electromagnetic switch; and screw means for removably fastening said another end of said first terminal member having said through hole fitted on said screw-threaded portion of said input terminal of said electromagnetic switch to mechanically and electrically connect said fuse circuit unit and said electromagnetic switch together;

said engaging means and said fastening means cooperatively mechanically and electrically interconnecting said fuse circuit unit and said electromagnetic switch together such that said first load circuit is fed from said power supply means via said input and output terminals of said electromagnetic switch, and said second load circuit is fed from said power supply means via said first and second terminals of said main fuse, said fuse circuit and said electromagnetic switch being independently operable.

7. A fuse circuit unit as claimed in claim 6, wherein said casing of said fuse circuit unit is molded from a resin in a one-piece body, together with said first and second terminal members.

8. A fuse circuit unit as claimed in claim 6, wherein said engaging means provided on said casing is formed integrally with said casing.

9. A fuse circuit unit as claimed in claim 6, further including a third terminal member supported by said casing of said fuse circuit unit, said third terminal member having one end thereof formed with a through hole for having said connecting screw-threaded portion being said output terminal of said electromagnetic switch disengageably fitted therethrough, said third terminal member cooperating with said first terminal member to reinforce the connection of said casing with said electromagnetic switch.

* * * * *